Patented Dec. 17, 1946

2,412,607

UNITED STATES PATENT OFFICE 2,412,607

AMMONIUM THIOSULFATE

Henry V. Farr, Ferguson, Mo., and John R. Ruhoff, Bronxville, N. Y., assignors to Mallinckrodt Chemical Works, St. Louis, Mo., a corporation of Missouri No Drawing. Application October 21, 1943, Serial No. 507,178

7 Claims. (Cl. 23—115)

This invention relates to ammonium thiosulfate, and more particularly to methods for the preparation of this compound.

Among the objects of this invention are the provision of an improved method for the preparation of ammonium thiosulfate; the provision of an improved method for preparing ammonium thiosulfate in crystalline form; the provision of an improved method for the provision of a stable ammonium thiosulfate solution; the preparation of anhydrous ammonium thiosulfate; the preparation of anhydrous ammonium thiosulfate in stable form; and the provision of anhydrous ammonium thiosulfate and ammonium thiosulfate solutions, both of which are stable and do not decompose under appropriate conditions of storage. Other objects will be in part obvious and in part pointed out hereinafter.

The invention accordingly comprises the steps and sequence of steps, and features of manipulation, which will be exemplified in the methods and products hereinafter described, and the scope of the application of which will be indicated in the following claims.

Ammonium thiosulfate has long been known to be a superior photographic fixing agent. It has the advantage that it will fix the photographic image at a much more rapid rate than sodium thiosulfate, the customarily employed fixing agent. Ammonium thiosulfate, however, has not been widely used because it has been expensive to produce and because a product sufficiently free from impurities for photographic use has not been available. Such small quantities of ammonium thiosulfate as have been used have customarily been marketed in the form of a concentrated solution, chiefly because economical methods of preparing a stable crystalline product, particularly one in the anhydrous state, have not been known. The transportation of a solution is difficult because it has, in the case of ammonium thiosulfate, been shipped in glass carboys, which adds greatly to the cost because the carboys themselves are expensive and must be shipped back to the manufacturer when empty. This greatly increases transportation costs.

It has now been found that in accordance with the present invention, ammonium thiosulfate can be easily and economically prepared as a product of great purity, and that it may, if desired, be made in the form of an anhydrous crystalline solid. The ammonium thiosulfate prepared in accordance with the present invention, either in the form of a solution or as a solid, is stable and will not undergo decomposition under appropriate storage conditions.

Ammonium thiosulfate is prepared in accordance with the present invention by the reaction of ammonium sulfite and sulfur in the presence of sulfide ions. The probable course of the reaction is as follows when ammonium sulfide is used:

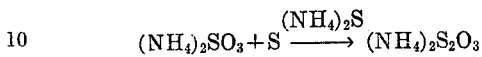

$$(NH_4)_2SO_3 + S \xrightarrow{(NH_4)_2S} (NH_4)_2S_2O_3$$

Ammonium sulfite may be prepared by any convenient means, such as by the reaction of sulfur dioxide with ammonia in the presence of water to produce ammonium sulfite solution. Where ammonium thiosulfate has in the past been prepared by the reaction of ammonium sulfite and sulfur, the reaction has not proceeded smoothly. The reaction is extremely slow, and apparently requires conditions of temperature and concentration which make it economically unfeasible. It has been found, however, that where, as in the present invention, the reaction is carried out in the presence of sulfide ions, the reaction itself takes place easily in a comparatively short time interval and may be carried out at a wide range of temperatures. Since, as indicated in the foregoing reaction, the ammonium sulfide is not consumed by the reaction, only a relatively small proportion is required. The ammonium sulfide apparently acts as a carrier or solubilizer for the sulfur which reacts with the ammonium sulfite to form ammonium thiosulfate.

The above reaction is, however, preferably carried out by keeping the reaction temperature low, and by having present in the reaction mixture an excess of ammonium hydroxide. The reaction is preferably carried out between sulfur, ammonium sulfide and ammonium sulfite in the presence of such an amount of ammonium hydroxide that the final reaction solution is about 1N in ammonium hydroxide. Ammonium sulfide is preferably employed to provide the sulfide ions, since it does not introduce an undesired cation. Other sulfides could be substituted but would in effect contaminate the reaction product. The reaction is preferably carried out at a temperature of from 30 to 55° C.

At the end of the reaction, the liquors contain ammonium hydroxide, ammonium sulfide or polysulfide, and excess sulfur, in addition to the ammonium thiosulfate product, the ammonium sulfite, having been substantially completely converted to the thiosulfate. The ammonium thiosulfate could be isolated directly from this solution. However, from an economic viewpoint it is preferable to treat the solution so that more ammonium thiosulfate is formed at the expense of the impurities present in the reaction solution. This is accomplished by the careful addition of ammonium bisulfite solution to the reaction mixture. This addition neutralizes the excess ammonia to form ammonium sulfite, and the ammonium sulfite is converted to ammonium thiosulfate by reaction with the ammonium sulfide remaining in the solution. Neutralization of the ammonia favors the reaction of the ammonium sulfide and the ammonium sulfite, which may thereby be made to take place readily and substantially completely. By proper selection of the reaction conditions and concentrations, and by careful addition of the ammonium bisulfite, the final solution will contain insignificant amounts of ammonium sulfide, ammonia, and ammonium sulfite, when considered in the light of commercial specifications for ammonium thiosulfate. The percentages may be of the order of from 0 to 1% ammonium sulfide, from 0 to 1.5% ammonia, and from 0.5 to 1% ammonium sulfite.

The solution may contain a small amount of colloidal sulfur, and is preferably therefore filtered, with or without a prior adjustment by the addition of ammonium bisulfite. At this point a controlled amount of ammonium hydroxide is preferably also added to aid in the preservation and stabilization of the ammonium thiosulfate. The filtered solution is then ready for sale as such, or may be used as feed for the evaporator if crystalline anhydrous ammonium thiosulfate is desired.

Ammonium thiosulfate solutions are unstable in the presence of heat, and concentration of such solutions has in the past been carried out usually at temperatures in the neighborhood of 30° C. by operation under a high vacuum.

It has been found, however, that in accordance with the present invention, ammonium thiosulfate solutions can be concentrated at atmospheric pressure if this is carried out in the presence of ammonia, or of ammonium sulfite or both. Pressures below atmospheric may be employed if desired, but this is not necessary.

Ammonium thiosulfate solutions may thus be concentrated under atmospheric pressure by heating and simultaneously blowing ammonia gas into the solution. The ammonia is recovered from the vapors. If ammonium sulfite is present, the solution can be heated to a higher temperature and hence less ammonia is required to evaporate the same quantity of water, and the higher the percentage of ammonium sulfite, the hotter the solution can be heated. Ammonium sulfite is not essential, and the evaporation can be carried out with ammonia alone in the substantially complete absence of ammonium sulfite if desired.

If the concentration is carried out under reduced pressure, a smaller proportion of ammonia is required. The lower the pressure, the less ammonia will be necessary. Likewise, if ammonium sulfite is present, less gaseous ammonia is needed. Aqueous ammonia may be substituted for gaseous ammonia, but in this event more water will have to be evaporated, although the concentration can be carried out.

In general, ammonium thiosulfate is preferably crystallized from liquors containing of the order of 3% of ammonium sulfite. This improves the stability of the ammonium thiosulfate, and also aids in the subsequent drying step. The ammonium sulfite need not be present in the mother liquor, but the salt can be washed with ammonium sulfite solution if it is desired to introduce additional proportions of ammonium sulfite to stabilize the drying step.

The factors pointed out above for the evaporation of ammonium thiosulfate solutions also apply to the drying of moist crystalline ammonium thiosulfate. Ammonium thiosulfate is not a stable product, and dissociates substantially over normal drying temperature ranges. It has been customary therefore, where such drying has been carried out, to effect it in a vacuum over a drying agent, such as sulfuric acid, and at a temperature of about room temperature.

In accordance with the present invention it has been found that ammonium thiosulfate can be dried at temperatures above those at which decomposition would ordinarily occur, if ammonia is present in sufficient quantity in the atmosphere in the drying chamber. The higher the temperature of drying, the greater the proportion of ammonia which must be present in the atmosphere in order to prevent the dissociation of the ammonium thiosulfate. We believe that the partial pressure of the ammonia present must be at least as great as the dissociation pressure of the ammonium thiosulfate at the temperature of treatment in order to prevent dissociation of the ammonium thiosulfate. As long as the ammonia is present to at least this extent, the ammonium thiosulfate will dry without decomposition. However, whatever the correct explanation may be, this drying may be carried out at atmospheric pressures, or under vacuum, or by placing the thiosulfate in a cabinet containing trays of a drying agent, such as calcium oxide or merely in an ordinary heated pipe drier, provided always that sufficient ammonia is present in the atmosphere.

In all of the above processes in which ammonia is employed, the ammonia is of course preferably recovered from the moisture-laden atmosphere removed from the concentrating or drying chambers.

The following description is given by way of example to indicate one form in which the invention can be carried out:

1800 pounds of water, 2890 pounds of ammonium sulfite and 140 pounds of 28% ammonium hydroxide solution are placed in a tank of 500 gallons capacity equipped with an agitator. 90 pounds of ammonium sulfide solution of 40% concentration and 800 pounds of sulfur are then added, and the mixture is vigorously agitated. The temperature at which this agitation takes place may vary over fairly wide limits, but it is preferred to maintain the temperature between 30 and 50° C. As the agitation proceeds the liquid gradually turns yellow due to the formation of ammonium polysulfide, and the appearance of this yellow color indicates that the main reaction is terminated since the ammonium polysulfide can only form after the ammonium sulfite has been completely converted to ammonium thiosulfate. With the agitation continuing, ammonium bisulfite solution of any suitable concentration, but preferably of about 66% strength, is then added in small portions to the reaction mixture, allowing the mixture to stir for about 10 minutes between each addition. The reaction mixture is tested from time to time for the absence of sulfite ions, and the presence of sulfide ions. This is simply accomplished by allowing the reaction mixture to stir for a time and observing whether the yellow color reappears. The reappearance of the yellow color indicates absence of sulfite, and also presence of ammonium sulfide. The total acidity of the solution is also periodically checked to determine the amount of excess ammonium hydroxide. When the point is finally reached at which the addition of a small amount of ammonium bisulfite gives a permanently water white solution which by additional test is shown to be free from sulfide, the reaction is considered to be completed.

This solution is then filtered through a filter press in order to remove such excess sulfur and colloidal sulfur as may be present, and discharged into a second tank. At this point sufficient ammonium sulfite is added to completely remove from the solution all of the remaining sulfide ion, and during this stage a slight amount of colloidal sulfur may precipitate out. Ammonium hydroxide is then added to preserve and stabilize the ammonium thiosulfate. The amount to be added at this point is largely optional, but sufficient to produce a solution of about pH 8 is preferred. The solution is again filtered through a filter press to remove any solid material, and is then ready for sale as such, or is suitable for feed to the evaporator.

About 400 gals. of 60% ammonium thiosulfate solution are placed in a 500 gal. stainless steel tank equipped with a stainless steel internal heating coil and a stainless steel agitator. The liquor is agitated to avoid local overheating and is heated as rapidly as possible. When the temperature reaches about 80° C. anhydrous ammonia is bubbled into the solution through a stainless steel tube extending nearly to the bottom of the tank. The solution is heated to approximately 105° C. and the anhydrous ammonia is bubbled in at the rate of approximately 1 lb. per hour. After about 3 hours the rate of addition of ammonia is increased to about 1½-2 lbs. per hour. The temperature is not allowed to exceed 105° C. Generally 6 or 7 hours evaporation will concentrate the solution to such an extent that crystals of ammonium thiosulfate will separate from it on cooling. The concentrated solution is then filtered while still hot and permitted to crystallize. The crystals are separated from the liquors by any convenient means. In the moist state the crystals are subject to accelerated rates of decomposition and should preferably be exposed to air as short a time as possible.

The mother liquors from the crystallization may be returned to the evaporator and again concentrated to yield further crops of ammonium thiosulfate, or, if desirable, they can be mixed with fresh feed solution prior to evaporation.

Drying the moist ammonium thiosulfate crystals may be accomplished following conventional drying practices, if, as has been pointed out, salt is maintained in an ammonia-containing atmosphere throughout the drying operation. We have found it convenient to place trays of ammonium thiosulfate in a drying chamber, gradually heating the chamber to a temperature in the neighborhood of 50° C. while continually passing a stream of gaseous ammonia into the chamber during the drying operation. The ammonia may be recovered by passing the moist, ammonia-containing effluent vapors from the drying chamber through a scrubbing tower, or by any other convenient means.

The anhydrous ammonium thiosulfate thus obtained is substantially stable over an indefinitely long period of time, when stored in gas-tight containers. If stored in ammonia-tight containers containing an atmosphere of ammonia the anhydrous salt is substantially free from any tendency to decompose.

It has been found in addition that the solution of ammonium thiosulfate is likewise stable, and may be stored for extended periods. The solution, if this is the desired final form, is preferably concentrated to contain 60% of ammonium thiosulfate. Such a 60% solution will not deposit crystals unless it is subjected to low temperatures, and is quickly and easily mixed with other ingredients to form a photographic fixing bath, for example.

Attention is directed to our copending application, Serial No. 666,811, filed May 2, 1946.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. The method of concentrating ammonium thiosulfate solutions which comprises evaporating such solutions in contact with ammonia.

2. The method of concentrating ammonium thiosulfate solutions which comprises evaporating said solution in contact with ammonia and ammonium sulfite.

3. The method of dehydrating ammonium thiosulfate which comprises evaporating water from hydrous ammonium thiosulfate in contact with gaseous ammonia.

4. The method of dehydrating ammonium thiosulfate which comprises evaporating water from hydrous ammonium thiosulfate in contact with gaseous ammonia at a partial pressure at least equal to the dissociation pressure of the ammonium thiosulfate under the dehydration conditions.

5. The method of making stable anhydrous ammonium thiosulfate which comprises mixing ammonium sulfite and sulfur in the presence of a substantial proportion of ammonium sulfide and of ammonium hydroxide, neutralizing the resulting solution with ammonium bisulfite and evaporating the resulting solution in the presence of ammonia and ammonium sulfite.

6. The method of dehydrating ammonium thiosulfate crystals which contain water, which comprises evaporating water from said crystals in contact with gaseous ammonia from an outside source.

7. The method of dehydrating ammonium thiosulfate crystals which contain water, which comprises evaporating water from said crystals in contact with gaseous ammonia from an outside source at a partial pressure at least equal to the dissociation pressure of ammonium thiosulfate under the dehydration conditions.

HENRY V. FARR.
JOHN R. RUHOFF.